Patented Oct. 12, 1937

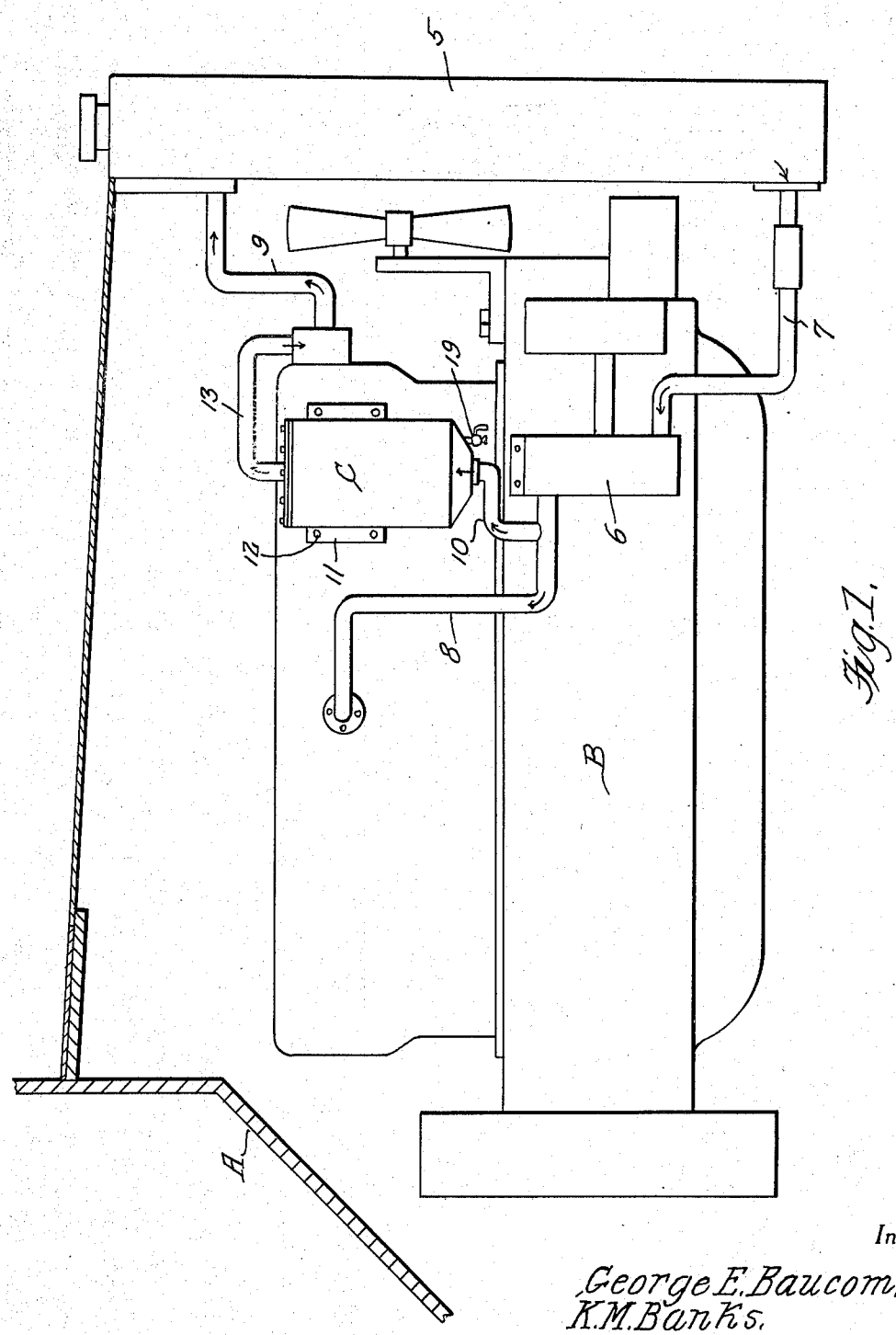

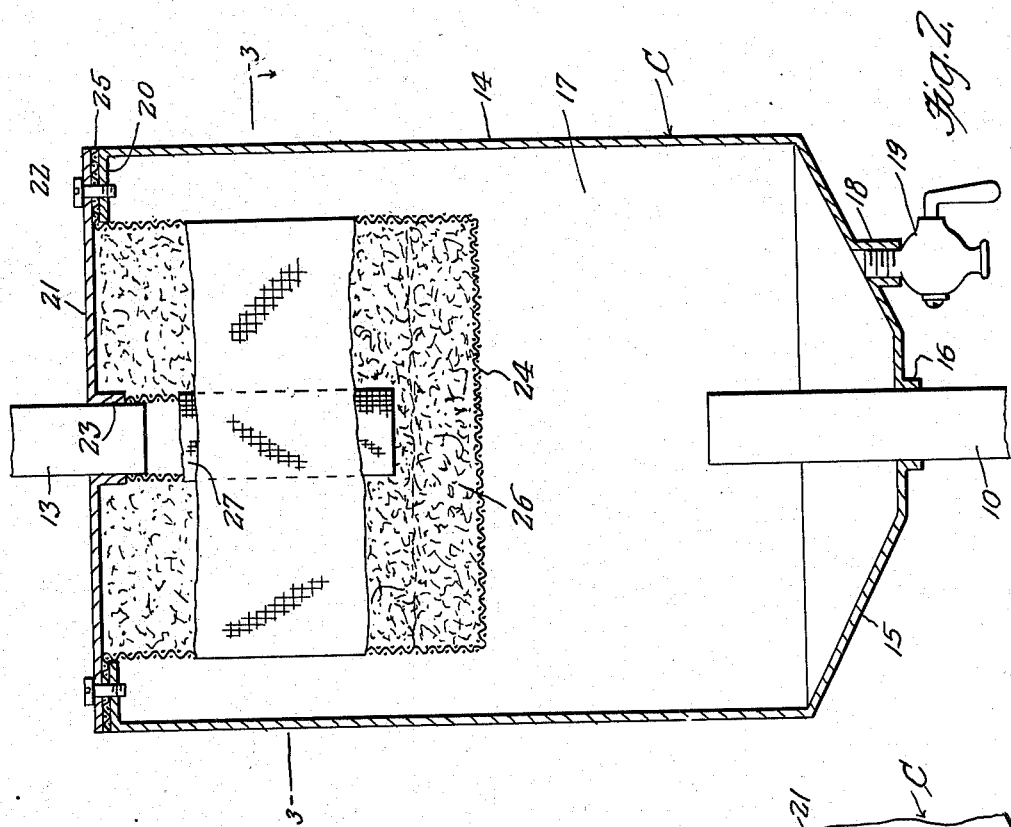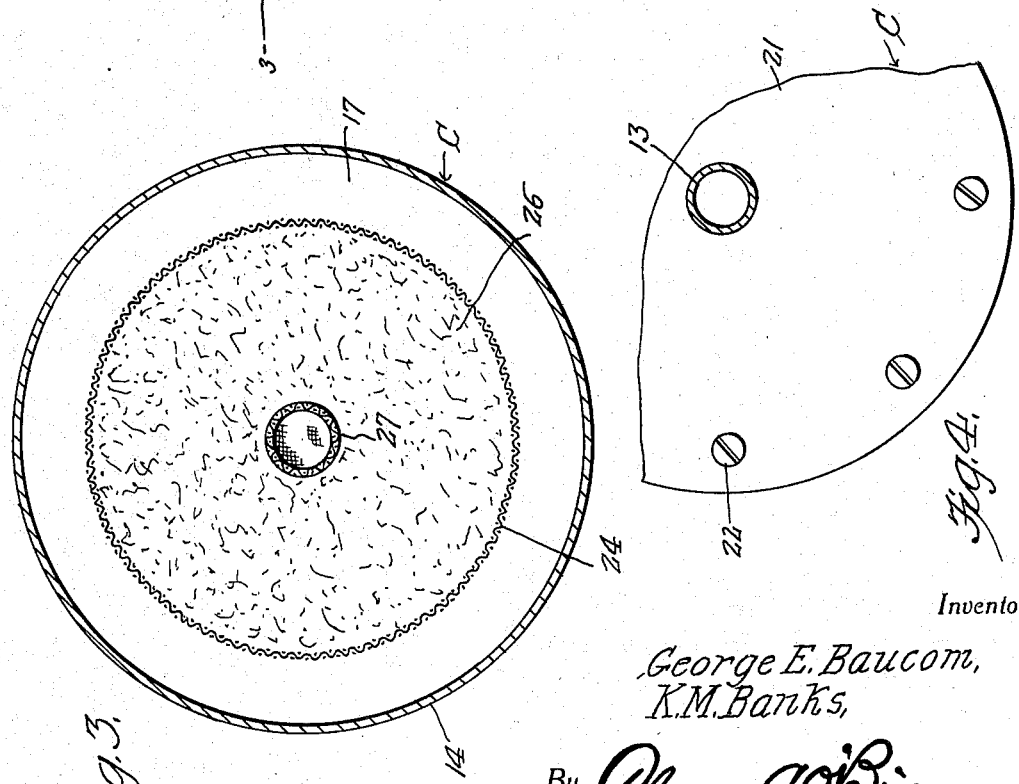

2,095,407

UNITED STATES PATENT OFFICE 2,095,407

INTERNAL COMBUSTION ENGINE WATER SYSTEM CLEANER

George E. Baucom and Kelso M. Banks, Raleigh, N. C.; said Banks assignor to Harry H. Hearn Application July 27, 1935, Serial No. 33,588
Renewed August 11, 1937

1 Claim. (Cl. 210—131)

This invention relates to cleaning apparatus for water systems on internal combustion engines.

The primary object of the invention is to clean and strain all foreign particles from the water used in cooling internal combustion engines so as to eliminate corrosion in the water jackets of the cylinders of the engine.

Another feature of the present invention is to place a cleaner in a by-pass in the water circulating system so that only a portion of the volume of the circulating water is being cleaned while the remaining portion is circulating.

Further objects of the invention are to provide a device of the character referred to that is strong, compact and durable, thoroughly reliable for its intended purpose, very simple and easy to install in the conventional water circulating system and comparatively inexpensive to manufacture and operate.

With the foregoing and other objects in view the invention consists of a novel construction, combination and arrangement of parts as will be hereinafter more specifically described and illustrated in the accompanying drawings, wherein is disclosed an embodiment of the invention, but it is to be understood that changes, variations, and modifications may be resorted to without departing from the spirit of the claims hereunto appended.

In the drawings wherein like reference characters denote corresponding parts throughout the several views:

Figure 1 is a fragmentary section through the forward portion of an automobile showing the internal combustion engine in side elevation and an adaptation therewith of a cleaning device in accordance with the present invention.

Figure 2 is a detailed vertical section through the cleaning tank removed from the water circulating system.

Figure 3 is a horizontal section taken substantially on line 3—3 of Figure 2.

Figure 4 is a fragmentary top plan view of the cleaning tank.

Referring to the drawings in detail, A indicates generally an automobile carrying an internal combustion engine B in the forward end thereof. As is customary in the construction of automobiles the radiator 5 is supported on the forward end of the automobile in front of the internal combustion engine B.

The cleaner of the present invention is adapted for installation in a pressure water circulating system which pressure is developed by a conventional pump 6 carried on the side of the internal combustion engine. From the bottom of the radiator 5 the water is withdrawn through the conductor 7 into the bottom of the pump and forced out of the top of the pump through the conductor 8 into the side of the internal combustion engine where it circulates through the cylinders and passes out of the top of the engine through the conductor 9 into the top of the radiator.

In the installation of the cleaner in accordance with the present invention there is a branch conductor 10 connected with the conductor 8 which extends into the bottom of the cleaning tank C and this cleaning tank C is carried by the side wall of the internal combustion engine on a bracket 11 secured thereto by means of bolts 12. From the top of the cleaning tank C there extends the outlet conductor 13 which is connected on its outer end to the conductor 9 that leads into the radiator 5. It will thus be seen that a portion of the water circulated under pressure by the pump 6 is by-passed through conductor 10 into tank C and out conductor 13 whereupon only a portion of the volume of water being circulated is passed through the cleaner.

The cleaning tank C of the present invention is preferably cylindrical in shape and formed of metal. The side walls of the tank are indicated at 14 and the bottom wall 15 is in the shape of a basin. In the center of the bottom wall 15 is an opening about which is a depending flange 16 through which the upper end of conductor 10 extends. The inner end of conductor 10 projects above the bottom wall 15 and into the bottom of the chamber 17 in the tank. To one side of the conductor 10 there is formed a depending nipple 18 into which is threaded the petcock 19 for the purpose of draining the tank.

At the upper end of the side walls 14 is an inset horizontal flange 20. Secured to this flange is a cover plate 21 bolted thereto by means of the bolts 22. In the center of cover plate 21 is a flange 23 that depends into the interior of the tank. Connected to the flange 23 is the inner end of the conductor 13 that forms the outlet to the tank.

A circular basket or container 24 extends into the chamber 17 about one-half the height of the tank. This container 24 is formed of reticulated material such as heavy copper screening. On the upper end of the container 24, it has a lateral flange 25 secured between the upper face of flange 20 and the bottom of the cover plate 21 whereby it is clamped in position. The shanks of the bolt 22 extend through openings in the flange 25.

In the basket or container 24 there is placed mineral filtering material 26 such as sand, gravel, or other filtering material in the amorphous condition or it may be in a solid cake. It is to be understood that the filtering material 26 substantially fills the container 24 with the exception that the central strainer 27 in the form of a porous shell extends into the filtering material. The strainer 27 is disposed concentric with respect to the container 24 and is likewise formed of fine reticulated material such as copper screening. Strainer 27 is tubular in shape and closed at its free inner end, while the upper end thereof fits over the inner end of outlet conductor 13.

As a portion of the cooling water is by-passed through conductor 10 and into the chamber 17 of the tank it flows through the filtering material 26 in the container 24. The filtering material 26 removes all solid particles of material in the water and holds the particles mechanically. Any particles that escape through the filtering material is impeded by the walls of the screen 27, which walls are of a finer mesh than the walls of the container 24. It will thus be seen that all particles in the water are removed from the water in the cooling system thereby eliminating the corrosion in the water jackets in the engine.

Having thus described the invention, what is claimed as new is:

A strainer comprising a tank, said tank being provided with a top, a reticulated basket supported by the said top and depending into the said tank, said basket terminating short of the bottom of said tank, filtering material in the basket, a pipe extending into the tank below the basket, said top being provided with an opening, said top being provided with a depending annular flange at the said opening therein, a cylindrical-shaped straining element embedded in the filtering material and having one end abutting the said flange, the other end terminating short of the bottom of the basket, and a second pipe extending through the opening of the top and snugly fitted in the said flange and cylindrical strainer.

GEORGE E. BAUCOM.
KELSO M. BANKS.